(12) United States Patent
Gmirya et al.

(10) Patent No.: US 6,666,102 B2
(45) Date of Patent: Dec. 23, 2003

(54) FLEXIBLE BEARING ARRANGEMENT FOR DOUBLE HELICAL PINION

(75) Inventors: Yuriy Gmirya, Rego Park, NY (US); Jules G. Kish, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 41 days.

(21) Appl. No.: 10/147,575

(22) Filed: May 16, 2002

(65) Prior Publication Data

US 2003/0213320 A1 Nov. 20, 2003

(51) Int. Cl.[7] ............................................. F16H 57/00
(52) U.S. Cl. .......................................... 74/406; 74/411
(58) Field of Search ..................... 74/446, 447, 424.5, 74/406, 411

(56) References Cited

U.S. PATENT DOCUMENTS

| 5,113,713 A | * | 5/1992 | Isabelle et al. ............... 74/410 |
| 5,813,292 A | * | 9/1998 | Kish et al. ................. 74/665 C |
| 5,974,911 A | * | 11/1999 | Pias et al. ................. 74/665 C |

* cited by examiner

Primary Examiner—David Fenstermacher
(74) Attorney, Agent, or Firm—Bachman & LaPointe, P.C

(57) ABSTRACT

The present invention relates to a flexible bearing assembly for use in a transmission system. The flexible bearing assembly has a gear mounted to a first shaft, first and second pinions connected to a second shaft, and a flexible coupling element connected to the gear and the first pinion. The flexible coupling element is preferably formed by a flexible diaphragm.

31 Claims, 3 Drawing Sheets

FLEXIBLE BEARING ARRANGEMENT FOR DOUBLE HELICAL PINION

BACKGROUND OF THE INVENTION

The present invention relates to a flexible bearing assembly for use with a double helical pinion. The bearing assembly has particular use in transmission systems, such as those used to drive the main rotor shaft of a helicopter.

A wide variety of transmission systems have been employed to transmit mechanical power from an axially fixed gear to the gearing arrangement which drives the ma in rotor shaft of a helicopter. These transmission systems while effective to accomplish their mission often suffer from deficiencies such as making too much noise or not being able to provide the desired level of contact between the gears.

SUMMARY OF THE INVENTION

Accordingly, it is an object of the present invention to provide a flexible bearing assembly for use in a transmission system that provides an effective connection despite manufacturing errors, temperature effects, and misalignments.

It is a further object of the present invention to provide a flexible bearing assembly for use in a transmission system with reduced levels of noise transmission.

It is yet a further object of the present invention to provide a flexible bearing assembly which has particular utility in helicopter transmission systems.

The foregoing objects are attained by the flexible bearing assembly of the present invention.

In accordance with t he present invention, a flexible bearing assembly for use in a transmission system broadly comprises a gear mounted to a first shaft, first and second pinions mounted to a second shaft, and a flexible coupling element connected to the gear and to the first pinion. In a preferred embodiment of the present invention, the flexible coupling element is a flexible diaphragm formed from a high strength steel material.

Other details of the flexible bearing arrangement for double helical pinion of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
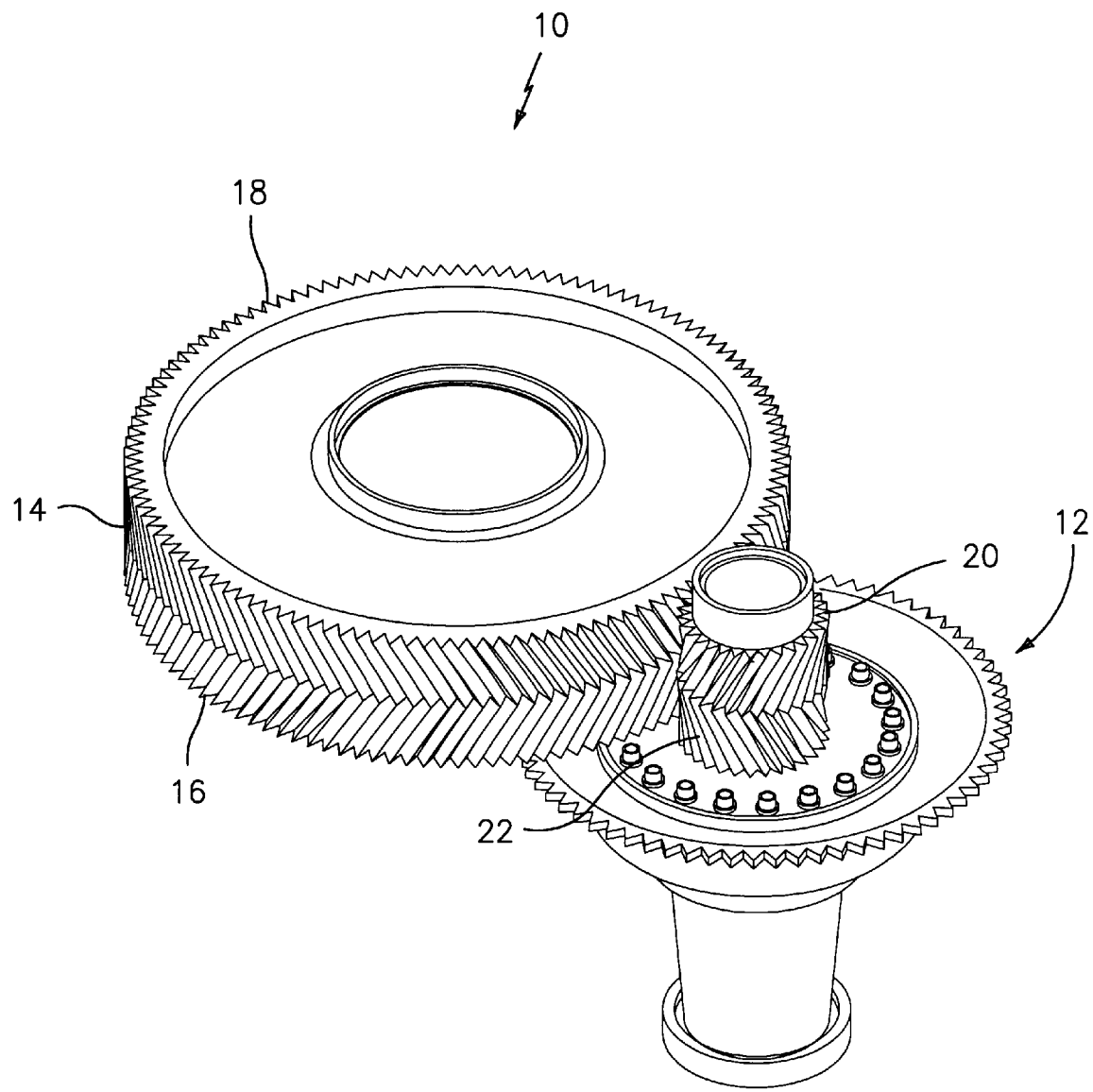
FIG. 1 is a schematic representation of a portion of a helicopter transmission system for driving a main rotor shaft.

Referring now to the drawings, FIG. 1 illustrates a portion of a helicopter transmission system. The transmission system 10 includes a bearing assembly 12 for engaging and driving helical gears 14 and 16 mounted to the main rotor shaft (not shown) of a helicopter by disk shaped connecting element 18. As can be seen from this FIG. 1, the bearing assembly includes double helical pinions 20 and 22 for engaging and driving the gears 14 and 16.

Figure 2:
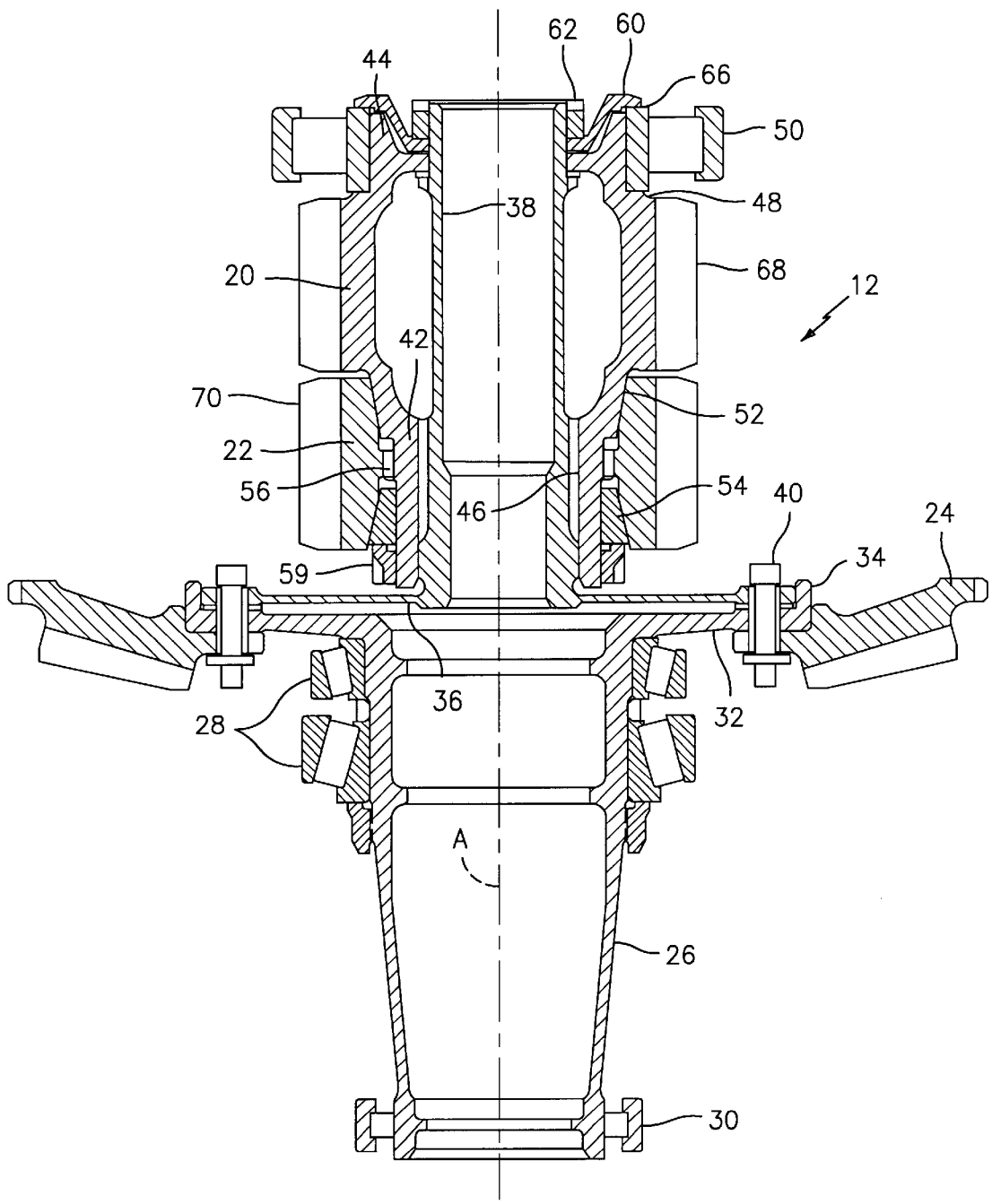
FIG. 2 is a sectional view of a first embodiment of a flexible bearing arrangement in accordance with the present invention.

Referring now to FIG. 2, the bearing assembly 12 includes a radially driven member 24 such as a spiral bevel gear. The member 24 is driven by a motor and gearing arrangement (not shown). Its position is defined by the radially driven member pitch apex point and is axially positioned to the bearing support housing (not shown) via adjusting shims (not shown). The bearing assembly 12 further has a first shaft 26 which is axially supported for rotation by upper and lower bearings 28 and 30 respectively. The shaft 26 has an integrally formed radial flange 32 with a right angle shoulder portion 34.

The bearing assembly further has a flexible coupling element 36 having an integrally formed second shaft 38. The flexible coupling element 36 preferably takes the form of a flexible diaphragm formed from a high strength steel, titanium or composite material. The selected material for the diaphragm depends on the diameter of the gear, the torque, and the available envelope. As can be seen from FIG. 2, the flexible coupling element 36 fits within a pilot formed by the radial flange 32 and the shoulder portion 34. The shoulder portion 34 limits the radial movement of the flexible coupling element 36. As can be seen from FIGS. 1 and 2, the flexible coupling element 36 is secured to the radial flange 32 by a plurality of nut and bolt connections 40.

The upper helical pinion 20 has an integrally formed lower member 42 and an integrally formed upper member 44. The gear 20 is secured to the shaft 38 by a spline 46, having a plurality of circumferentially spaced spline teeth, positioned between an inner surface of the lower member 42 and the outer periphery of the shaft 38. The upper member 44 has a shoulder 48 in which a bearing assembly 50 for radially supporting the bearing assembly 12 is seated.

The lower helical pinion 22 is held in position by upper and lower cone members 52 and 54 and by a spline 56 having a plurality of circumferentially spaced teeth which connect the lower helical pinion 22 to the lower member 42. The upper cone member 52, as shown in FIG. 2, is integrally formed into the lower member 42. The lower cone member 52 may be inserted into a space between the lower member 42 and the lower pinion 22. The lower cone member 52 may be secured in position using any suitable means known in the art. For example, the lower cone member 52 may be pressed onto the lower pinion 22. Alternatively, a nut member 57 may be secured to the lower member 42 to hold the lower cone member 52 in place.

To secure the double helical pinions 20 and 22 in position, a washer 60 may be placed around the shaft 38 and seated in a space 61 formed by the upper member 44. A nut 62 is then preferably placed over the washer 60. The nut 62 may have threads which engage mating threads on the shaft 38. As can be seen from FIG. 2, the washer 60 preferably has a wing portion 64 which overlaps and contacts an upper surface 66 of the upper member and the bearing assembly 50.

The upper helical pinion 20 has a plurality of teeth 68 for engaging the teeth of gear 14. The lower helical pinion 22 has a plurality of teeth 70 for engaging the teeth of gear 16. The teeth 68 and 70 may have various, but the same for both pinions, helical angles. Typically, one of the teeth 68 and 70 has a right hand helix angle, while the other of the teeth 68 and 70 has a left hand helix angle.

The flexible bearing assembly 12 thus provided has a number of advantages. The flexible bearing assembly 12 accommodates slight misalignments in the axial direction A between the shafts 26 and 38 without sacrificing contact between the teeth of gears 14 and 16 and pinions 20 and 22. The flexible bearing assembly 12 transmits torque and supports the double helical pinions 20 and 22 in a radial direction. The double helical pinions 20 and 22 have a vertical freedom which allows them to float. The bearing assembly 12 allows simultaneous contact in upper and lower helical mesh to compensate for manufacturing errors, temperature effects, and gearbox part deflection, as well as misalignments. The bearing assembly 12 makes possible the elimination of traditional bearing supports, reduces the design envelope, uses fewer parts, and reduces the weight of the transmission system. The flexible bearing assembly utilizes the benefit of high radial and low axial disk diaphragm stiffness. The coupling element 36 because of its flexibility functions as a damper and thus reduces noise. Yet another advantage is that the bearing assembly 12 permits an axially fixed bevel gear to be mated with an axially fixed double helical pinion on the same shaft assembly thereby satisfying the requirement for axial rigidity for the bevel gear and axial freedom for the double helical pinion. Also, noise reduction comes from the double helical mesh.

The stiffness of the coupling element 36 may be changed as needed by changing the physical properties of the material forming the coupling element 36 and/or the diameter of the coupling element 36 and/or the thickness of coupling element 36.

While the shaft 38 has been illustrated and described as being integrally formed with the coupling element 36, it should be recognized that it could be a separate element which is joined to the coupling element by suitable means such as spot welding.

Figure 3:
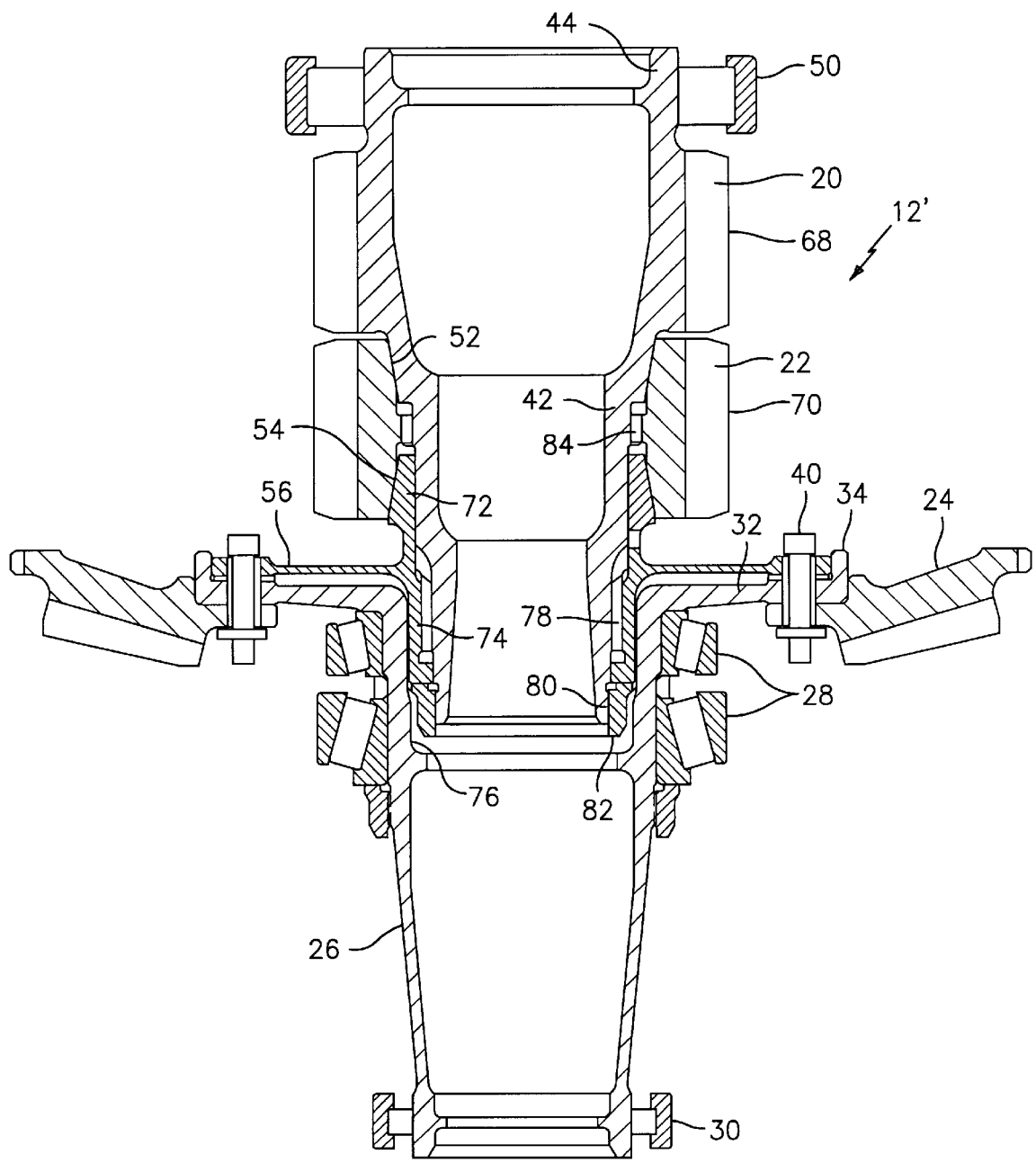
FIG. 3 is a sectional view of a second embodiment of a flexible bearing arrangement in accordance with the present invention.

Referring now to FIG. 3, an alternative embodiment of the bearing assembly 12' is illustrated. In this embodiment, as in FIG. 2, a first shaft 26 supported by upper and lower bearings 28 and 30 is provided. The shaft 26 has an integrally formed radial flange 32 with shoulder portion 34. The bearing assembly 12' also includes a driving member 24 such as a spiral bevel gear and a flexible coupling element 36. The flexible coupling element 36, as before, is joined to the radial flange 32 and to the driving member 24 by a plurality of nut and bolt connections 40.

The flexible bearing assembly 12' differs from the flexible bearing assembly 12 in that the coupling element has an integrally formed upper shaft member 72 which has an outer surface configured to form the lower cone member 54 for positioning the lower helical pinion 22. Further, the coupling element 36 has an integrally formed lower shaft member 74 which extends inwardly of the inner surface 76 of the shaft 26. Normally, there is a gap between the lower shaft member 74 and the surface 76. If the coupling element 36 were to fail, the lower shaft member 74 would come into contact with the surface 76. The support will prevent the teeth of pinions 20 and 22 from disengaging in the event of a coupling failure preventing secondary damage to the remainder of the transmission. This permits safe landing on a remaining engine.

As before, the upper helical pinion 20 has an integrally formed upper member 44 and an integrally formed lower member 42. As can be seen from FIG. 3, the upper member 44 contacts bearing assembly 50 which radially supports the upper end of the flexible bearing assembly 12'. The lower member 42 extends interiorly of the shaft members 72 and 74 and is connected to the lower shaft member 74 via a spline 78 having a plurality of circumferentially spaced apart teeth. The lower end 80 of the lower member 42 is preferably threaded to receive nut 82.

In this embodiment, the lower helical pinion 22 is joined to the lower member 42 via a spline 84 having a plurality of circumferentially spaced apart teeth. The lower helical pinion 22 is positioned relative to the upper helical pinion 20 by the lower cone member 54 formed by the shaft member 72 and by an upper cone member 52 formed in an outer surface of the lower member 42.

The flexible coupling element 36 comprises a flexible diaphragm and may be formed from any suitable high strength steel material having a desired stiffness.

The bearing assembly 12' has the same advantages as the bearing assembly 12 enumerated above.

It is apparent that there has been provided in accordance with the present invention a flexible bearing assembly for a double helical pinion which fully satisfies the objects, means, and advantages set forth hereinbefore. While the present invention has been described in the context and specific embodiment, others alternatives, modifications, and variations will become apparent to those skilled in the art having read the foregoing description. Accordingly, it is intended to embrace those alternatives, modifications and variations as fall within the broad scope of the appended claims.

What is claimed is:

1. A flexible bearing assembly for use in a transmission system comprising:
   a gear mounted to a first shaft;
   first and second pinions connected to a second shaft; and
   a flexible coupling element connected to said gear and said first pinion.

2. A flexible bearing assembly according to claim 1, further comprising:
   said first shaft having an integrally formed radial flange; and
   means for connecting said flexible coupling element to said radial flange.

3. A flexible bearing assembly according to claim 2, wherein said connecting means comprises a plurality of bolts.

4. A flexible bearing assembly according to claim 2, wherein said radial flange has a shoulder portion for limiting radial movement of said flexible coupling element.

5. A flexible bearing assembly according to claim 1, wherein said gear comprises a bevel gear.

6. A flexible bearing assembly according to claim 1, further comprising a plurality of bearings affixed to said first shaft for axially supporting said first shaft.

7. A flexible bearing assembly according to claim 1, wherein said flexible coupling element comprises a flexible diaphragm assembly formed from a material selected from the group of high strength steel, titanium, and composite materials.

8. A flexible bearing assembly according to claim 1, wherein said second shaft is formed integrally with said flexible coupling element, said first pinion is mounted to said second shaft by a first spline connection, and said second pinion is connected to said first pinion by a second spline connection.

9. A flexible bearing assembly according to claim 8, further comprising a pair of cones for securing said second pinion in position.

10. A flexible bearing assembly according to claim 9, wherein at least one of said cones is integrally formed into said first pinion.

11. A flexible bearing assembly according to claim 9, wherein said coupling element has an integrally formed upper shaft member and one of said cones is formed by an outer surface of said upper shaft member.

12. A flexible bearing assembly according to claim 11, wherein said coupling element has an integrally formed lower shaft member positioned internally of said first shaft, wherein said second shaft is integrally formed with said first pinion, and said lower shaft member is connected to said second shaft via a spline.

13. A flexible bearing assembly according to claim 12, further comprising a nut for engaging said second shaft.

14. A flexible bearing assembly according to claim 1, wherein said first pinion is an upper helical pinion and said second pinion is a lower helical pinion.

15. A flexible bearing assembly according to claim 12, further comprising an upper bearing surrounding a portion of said upper helical pinion for radially supporting said flexible bearing assembly.

16. A flexible bearing assembly according to claim 15, further comprising a nut and washer assembly for securing said upper and lower helical pinions in a desired axial position.

17. A transmission assembly comprising:
   a pair of helical gears attached to an element for driving a shaft to be driven;
   a driving gear; and
   a flexible bearing assembly for transmitting power from said driving gear to said pair of helical pinions, said flexible bearing assembly comprises a first shaft connected to said driving gear, upper and lower helical pinions for mating with said pair of helical gears, and a flexible diaphragm connected to said driving gear and to said upper and lower helical pinions.

18. A transmission system according to claim 17, wherein said element for driving a shaft comprises a means for driving a main rotor shaft of a helicopter.

19. A transmission system according to claim 17, wherein said driving gear comprises a spiral bevel gear.

20. A transmission system according to claim 17, wherein said first shaft has a radial flange and said flexible diaphragm is connected to said radial flange and to said driving gear by a plurality of bolts.

21. A transmission system according to claim 20, wherein said radial flange has a shoulder for limiting radial movement of said flexible diaphragm and for absorbing a load from said gears.

22. A transmission system according to claim 17, wherein said flexible diaphragm is formed from a material selected from the group consisting of high strength steel, titanium, and composite materials.

23. A transmission system according to claim 17, further comprising a plurality of bearings for radially supporting said first shaft.

24. A transmission system according to claim 23, further comprising an upper bearing surrounding said upper helical pinion for radially supporting the bearing assembly.

25. A transmission system according to claim 24, further comprising a nut for securing said upper and lower helical pinions in position.

26. A transmission system according to claim 17, further comprising a pair of cones for positioning said lower helical pinion relative to said upper helical pinion.

27. A transmission system according to claim 26, wherein one of said cones is formed by a shaft member connected to said flexible diaphragm.

28. A transmission system according to claim 26, wherein at least one of said cones is integrally formed into said upper helical pinion.

29. A transmission system according to claim 26, wherein said lower helical pinion is joined to a portion of said upper helical pinion by a spline connection.

30. A transmission system according to claim 26, wherein said upper helical pinion is joined to said second shaft by a spline connection.

31. A transmission system according to claim 26, wherein said flexible diaphragm has an integrally formed lower shaft member positioned internally of said first shaft, said second shaft forms part of said upper helical pinion, and said lower shaft member is connected to said second shaft by a spline connection.

* * * * *